United States Patent
Horstmann et al.

(10) Patent No.: US 10,794,345 B2
(45) Date of Patent: Oct. 6, 2020

(54) FUEL DISTRIBUTOR

(71) Applicant: BENTELER AUTOMOBILTECHNIK GMBH, Paderborn (DE)

(72) Inventors: Joerg Horstmann, Guetersloh (DE); Markus Mehring, Lichtenau (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 6 days.

(21) Appl. No.: 16/142,982

(22) Filed: Sep. 26, 2018

(65) Prior Publication Data
US 2019/0093613 A1     Mar. 28, 2019

(30) Foreign Application Priority Data
Sep. 26, 2017   (DE) .......... 10 2017 122 301

(51) Int. Cl.
| | |
|---|---|
| *F02M 55/00* | (2006.01) |
| *F02M 55/02* | (2006.01) |
| *F16L 55/11* | (2006.01) |
| *F02M 65/00* | (2006.01) |
| *F02M 41/16* | (2006.01) |

(52) U.S. Cl.
CPC .......... *F02M 55/005* (2013.01); *F02M 41/16* (2013.01); *F02M 55/02* (2013.01); *F02M 55/025* (2013.01); *F16L 55/1108* (2013.01); *F02M 65/006* (2013.01)

(58) Field of Classification Search
CPC .... F02M 55/005; F02M 55/02; F02M 55/025; F02M 41/16; F16L 55/1108
See application file for complete search history.

(56) References Cited

U.S. PATENT DOCUMENTS 6,148,797 A * 11/2000 Gmelin ............... F02M 55/025
                                                                123/456
6,431,608 B1  8/2002 Kato
(Continued)

FOREIGN PATENT DOCUMENTS

| DE | 29521402 | 6/1997 |
|----|----------|--------|
| DE | 19936534 | 3/2001 |

(Continued)

*Primary Examiner* — Sizo B Vilakazi
*Assistant Examiner* — Anthony L Bacon
(74) *Attorney, Agent, or Firm* — Jacobson Holman, PLLC.

(57) ABSTRACT

A fuel distributor features a pressure accumulator 2 with a longitudinal hollow space 3 to receive pressurized fuel. The pressure accumulator 2 possesses at least one threaded socket 7 which connects with the longitudinal hollow space 3 and which features interior threading 8, and into which a threading cap 11 with exterior threading 13 is inserted. The threading socket 7 features a sealing surface 16, which ends up being pressed onto a sealing seat 18 set up inside the pressure accumulator 2. According to the invention, a leakage channel 27 is formed within the threading cap 11. The configuration of the fuel distributor according to the invention with the leakage channel 27 in the threading socket 7 allows leakage testing under high pressure to be carried out during a short cycle or detection times, and with a high degree of precision.

9 Claims, 3 Drawing Sheets

(56) References Cited

U.S. PATENT DOCUMENTS

| | | | | |
|---|---|---|---|---|
| 2003/0084881 A1* | 5/2003 | Mori | ............... | F02M 55/005 |
| | | | | 123/456 |
| 2009/0315324 A1* | 12/2009 | Molloy | ............. | F01M 11/0408 |
| | | | | 285/148.19 |
| 2011/0023831 A1* | 2/2011 | Klesse | ............. | F02M 55/025 |
| | | | | 123/447 |
| 2013/0001891 A1* | 1/2013 | Tower | ............. | F02M 55/005 |
| | | | | 277/591 |
| 2015/0369689 A1* | 12/2015 | Kotlyar | ............. | G01M 3/022 |
| | | | | 73/49.8 |
| 2018/0038525 A1* | 2/2018 | Kwast | ............. | F02M 55/005 |
| 2018/0119657 A1* | 5/2018 | Suzuki | ............. | F02M 55/02 |

FOREIGN PATENT DOCUMENTS

| | | | | |
|---|---|---|---|---|
| DE | 10247524 | | 8/2004 | |
| DE | 102004059909 | | 6/2006 | |
| DE | 102007036500 | | 2/2009 | |
| DE | 102009032850 | | 1/2011 | |
| DE | 102009032850 A1 * | 1/2011 | ......... F02M 63/0077 |
| DE | 102015102877 | | 9/2016 | |
| DE | 102015116301 | | 3/2017 | |
| EP | 2006530 | | 12/2008 | |
| JP | 11072059 | | 3/1999 | |
| JP | 20040196592 | | 1/2004 | |

\* cited by examiner

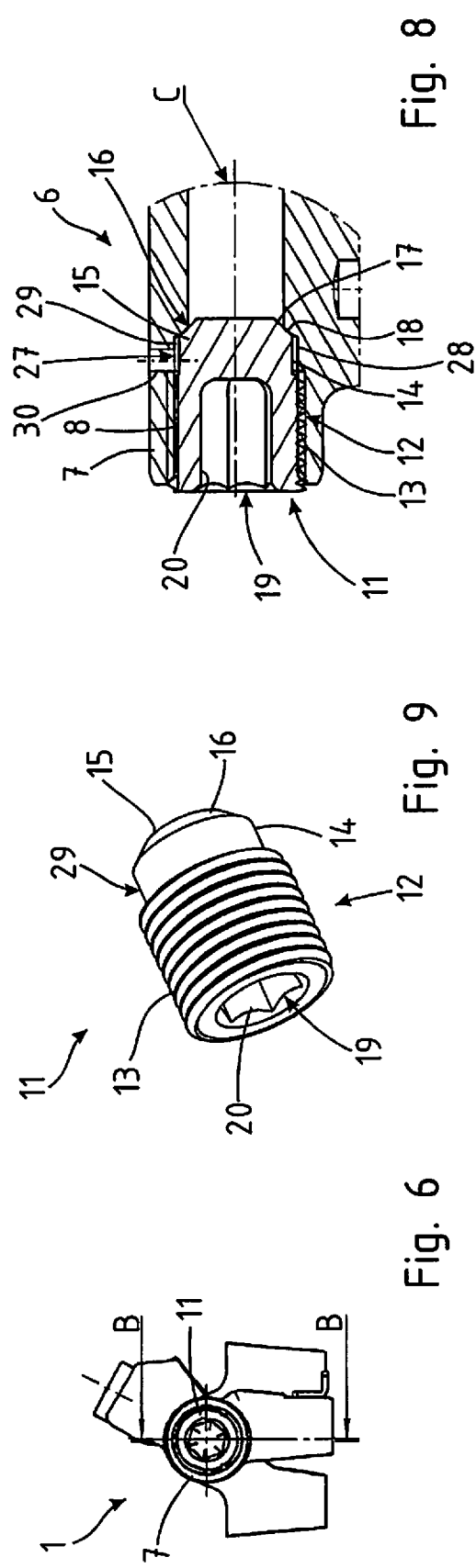

FUEL DISTRIBUTOR

BACKGROUND OF THE INVENTION

A fuel distributor, also called a common rail, is a component part of a fuel supplying or fuel injection system, and serves the purpose of bringing fuel to the injection valves of a combustion engine. As part of this process, statically compressed fuel is stored in a pressure accumulator that has the form of a distribution pipe, and made available on a distributed basis to the injectors or injection valves in a cylinder bank.

A fuel distributor featuring a distributor pipe formed out of a single cast piece is known from DE 10 247 524 B4.

DE 295 214 02 U1 discloses a fuel distributor in which the distributor pipe is formed by forging.

The pressure accumulator of a fuel distributor features a longitudinal hollow space to receive incoming pressurized fuel. The longitudinal hollow space in the pressure accumulator is manufactured through boring, typically through the so-called deep hole boring technique. The open end of the longitudinal hollow space is closed off using a threaded cap. For this purpose the end is formed as a threaded socket that features an inner threading, where the threaded cap with its exterior threading can be screwed in. In order to ensure the requisite leak-tightness level, the threaded cap features a sealing surface, which ends up being applied on a seal seat formed in the pressure accumulator.

In addition to a threaded socket on the open-end side of a pressure accumulator, it can feature additional threaded sockets, for example for the purpose of connecting a pressure sensor.

Threading connections for high pressure levels are problematic as far as reliable sealing off is concerned. The screw connection is drawn so far in place that seating pressure is achieved between the sealing surface and the sealing seat across the sealing area. In order to check the leak-tightness of the fuel distributor and the components attached with it, a leak detection test is carried out. In addition to leak detection tests using air and checking for pressure drops or for leaks by submersion in a water basin, testing methods using a noble gas, to perform a so-called sniffing test, have also become widespread. Helium in particular is used as the testing gas as part of this process. Sniff tests allow targeted locating of leaks with a high level of sensitivity.

Due to the low number of cycles for manufacturing in the automobile industry, there is only a limited amount of time available for leak detection testing. Consequently, there is generally an interest in conducting the leak detection testing in a quick and efficient manner. Normally the testing medium, or the testing gas, must find its way to the outside through the tiniest of threading channels, in order to be detected by the sensors in the sniffing test. The very short testing time available, which amounts only to seconds, however, does not allow for a reliable prediction of the leak-tightness of a fuel distributor to be made. Leakages are then often detected during the driving cycle only after several thousand kilometers have elapsed.

U.S. Pat. No. 6,431,608 B1 discloses a connection configuration featuring an integrated leakage channel on the connection of a pipeline to a connection component in fuel systems.

DE 10 2004 059 909 A1 proposes a pipeline screw connection that consists of a connector junction, a pipeline, and a coupling nut, with which any eventual amount of leakage can be directed away through the coupling nut.

DE 10 2015 102 877 A1 also exhibits a connection configuration to the connection of a pipeline leading to a connection component in fuel or hydraulic systems, where the pipeline can be connected to the connecting component using a junction element that has the form of a coupling nut. Through the coupling nut, a sealing head is pressed in a leak-tight fashion into a sealing seat designed into the connection component. On the reverse side of the sealing head, a leakage channel has been provided outside the sealing surface and sealing seat.

A closeoff screw featuring a leakage channel that has been designed as a plastic injection molding component, is featured in DE 10 2015 116 301 A1.

SUMMARY OF THE INVENTION

Based on the current state of the art, the invention is based on the concept of providing a fuel distributor with improved characteristics for leak detection testing, in particular the short cycle or detection times, as well as a high degree of testing precision.

The solution for this task is provided according to the invention in the form of a field distributor.

Advantageous configurations and further developments in the fuel distributor according to the invention are the subject of the dependent claims.

According to the invention, a leakage channel has been provided in the threading. The pressure accumulator within the field distributor has been designed in particular in the form of a pipe, and features a longitudinal hollow space. The leakage channel is situated behind the sealing head as seen from the perspective of the longitudinal hollow space in the pressure accumulator, and is in contact with the outside of the field distributor, or the pressure accumulator. In the event there is a leakage in the area of the sealing seat, testing gas will infiltrate through the leakage channel to the outside, and will thus be able to be detected reliably and quickly. Functionality in the sealing area, or in the area of the sealing seats between the pressure accumulator and the threading cap, is fully assured, despite at least one leakage channel being present.

One aspect of the invention provides for the threading cap featuring a cylindrical section with a conical end section, on which the sealing surface is formed.

The threading cap takes over the function of a capping screw and seals off the pressure accumulator from the environment. At the same time, the threading cap has been conceptualized in such a way that leakages can be detected quickly and reliably as part of the leak detection testing process, through the leakage channel provided for under the invention.

As part of an advantageous configuration of the threading cap, the threading cap has been designed to feature an interior polyhedral-shaped recess. The interior polyhedral recess is formed as a tool attachment point. With the application of a suitable tool, the threading cap can be screwed into the threading socket. In so doing, the end section with its sealing surface is pressed into a sealing cone within the pressure accumulator. If required, the threading cap can also be uninstalled from the threading socket in the pressure accumulator.

A particularly advantageous configuration of the invention provides for the leakage channel being formed by at least one axially positioned nut on the exterior threading of the threading cap. Preferably, multiple nuts are arranged facing one another in a partial circle along the exterior circumference of the exterior threading.

The leakage channel can continue to be formed by lateral boring through the cross-section of the cylinder, which is in contact with the recess in the threading cap. For this purpose the recess can be stepped, and feature a blind borehole in the inside. The blind borehole forms the extension of the recession, and intersects with the cross borehole.

An alternative configuration provides for the leakage channel being formed by an exposed area formed between the exterior extent of the cylinder section and an interior extent section of the pressure accumulator. The exposed area can be formed within and/or on the cylinder section of the threading cap, and/or on the interior circumference of the pressure accumulator.

The threading socket is preferably a single-piece component of the pressure accumulator, and made of a single uniform material.

In particular, the threading socket is formed on an axial end of the pressure accumulator, specifically on the end of the pressure accumulator on the side of the opening. Through the threading socket, the end of the pressure accumulator is closed off tightly. On the other end, the pressure accumulator is closed off frontally. The other axial end can likewise be formed as an axially oriented connection, or as a threading socket. In such a case, the end will also be closed off by a threading socket, or a sensor will be screwed onto the end.

It is also possible that a threading socket can be arranged transversally to the length axis of the pressure accumulator on the pressure accumulator. In such a case, the threading cap taken up into the threading socket is used particularly for mounting sensors in place.

The threading cap is designed to be cold-form pressed according to the invention. The threading cap is a cold flow press component, the contour of which is called flow-pressed, during the process of which the threading grooves as well as the leakage channels are directly formed. Further processing steps for integrating the leakage channel into the threading cap are thus not necessary.

In principle, the threading cap can also be rolled, cut, or milled. One advantage of being designed as a cold flow press component is the high degree of precision and surface quality, as well as the enhanced durability characteristics.

DESCRIPTION OF THE DRAWINGS

The invention is described in the following sections based on design examples in greater detail. In the figures:

FIG. 6 shows a frontal view toward the opening-side end of a pressure accumulator;

FIG. 7 shows a longitudinal cross-section view through the pressure accumulator as per FIG. 6, along line B-B;

FIG. 8 shows an enlarged illustration of cutaway section C in FIG. 7;

FIG. 9 shows the threading cap according to the illustration in FIG. 8 from a perspective view;

Mutually correlating parts or components of parts are marked in the figures with identical reference numbers.

DETAILED DESCRIPTION OF THE INVENTION

Figure 1:
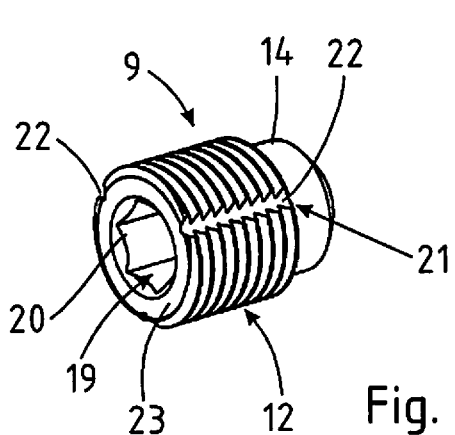
FIG. 1 shows a threading cap according to the invention, in a rear view perspective.

FIG. 7 shows a fuel distributor 1. The fuel distributor 1 is part of the reservoir injection system of a combustion engine. The pressure generation and fuel injection functions are mutually disconnected in such reservoir injection systems. A separate high-pressure pump generates continuous pressure. This pressure, which is accumulated independently from the injection sequence, is available on a permanent basis in the fuel distributor 1.

The fuel distributor 1 features a pipe-shaped pressure accumulator 2 with a longitudinal hollow space 3 as well as a fuel inlet on the side of the pump, not shown here, and also multiple injector connections 4. The statically compressed fuel is stored in the longitudinal hollow space 3 of the pressure accumulator 2 and made available to the injectors of a cylinder bank via the injector connections 4 on a distributed basis. In order to firmly anchor the fuel distributor 1 onto a combustion engine, mounting brackets 5 are provided.

The opening-side end 6 of the pressure accumulator 2 is configured as a threaded socket 7 and features interior threading 8. The threading socket 7 is in contact with the longitudinal hollow space 3 of the pressure accumulator 2.

In order to seal off the end 6 in a leak-tight fashion, a threading cap 9, 10, 11 is screwed into the threading socket 7.

Figure 2:
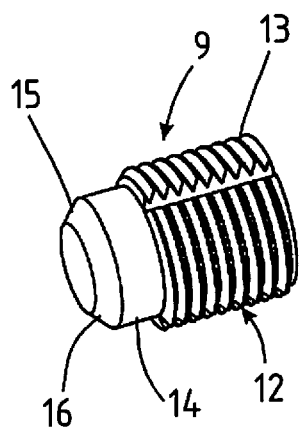
FIG. 2 shows the threading cap according to the illustration from FIG. 1 in a perspective view from the side of the sealing seat.
Figure 3:
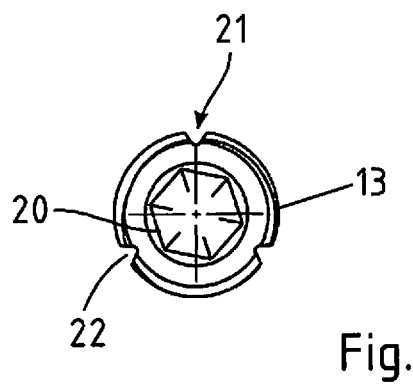
FIG. 3 shows the threading cap from a frontal view toward the centrally situated recess.

An initial design form of a threading cap 9 is illustrated in FIGS. 1 through 3.

Figure 4:
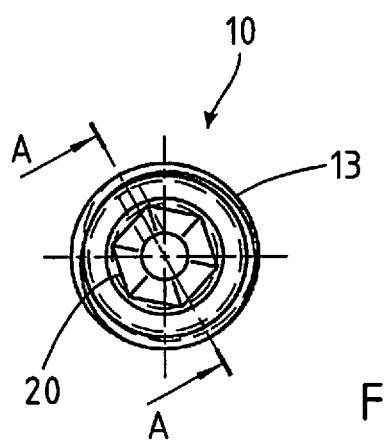
FIG. 4 shows a frontal view of a second design form for a threading cap.
Figure 5:
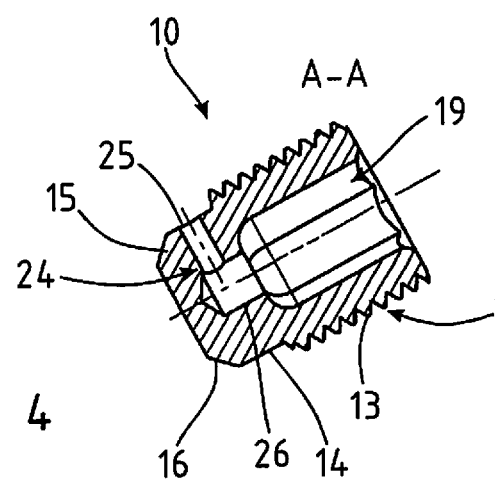
FIG. 5 shows a longitudinal cross section view of the threading cap as per the illustration in FIG. 4 along line A-A.

FIGS. 4 and 5 show a second design form for a threading cap 10.

The illustrations in FIGS. 6 through 8 show a third design form for a threading cap 11.

Each threading cap 9, 10, 11 features a threading section 12 with an exterior threading 13 oriented toward the interior threading 8 of the threading socket 7. From the threading section 12 toward the inside in the direction of the longitudinal hollow space 3, a cylindrical section 14, which features a conical end section 15, connects to the threading section 12.

A sealing surface 16 is formed on the conical end section 15. A sealing seat 18 is formed in a sealing cone 17 within the pressure accumulator 2. With the sealing surface 16, the threading cap 9, 10, 11 ends up being pressed onto the sealing seat 18 in a leak-tight fashion.

Each threading cap 9, 10, 11 features a centrally situated recess 19 that is externally accessible. In the recess 19, an interior polyhedral area 20 in the shape of an interior hexahedron is formed. The interior polyhedral area 20 serves as a tool attachment point for an outside polyhedral tool. By inserting the tool into the interior polyhedral area 20 and operating the tool, the threading cap 9, 10, 11 is screwed into the threading socket 7. In this fashion, the sealing surface 16 oriented forward in the direction of the longitudinal hollow space 3 ends up being pressed onto the sealing seat 18 in a leak-tight fashion. If required, the threading cap 9, 10, 11 can also be taken out of the threading socket 7 by actuating the tool in the opposite screw turning direction and removed from the pressure accumulator 2.

The threading cap 9 features a leakage channel 21, as can be seen in FIGS. 1 through 3. The leakage channel 21 is formed through axially positioned nuts 22 in the exterior threading 13. The nuts 22 run parallel along the longitudinal axis of the threading cap 9 and cut through the threading channels of the exterior threading 13. The nuts 22 or the leakage channel 21 extend to the front side 23 of the threading cap 9 and create a connection to the outside environment.

The installed threading cap 9 seals off the longitudinal hollow space 3 with its sealing surface 16 pressed on the sealing seat 18. During testing for leak-tightness, the pressure accumulator 2 is filled under pressure with a testing gas. In case of a leak in the area of the sealing seat 18, the testing gas will infiltrate via the leakage channel 21 to the exterior of the threading cap 9 and can presently be detected with suitable testing devices quickly and reliably.

In the case of the threading cap 10 illustrated in FIGS. 4 and 5, a leakage channel 24 is created in the form of a cross boring 25 made into the cylinder section 14. It is connected with the recess 19 in the threading cap 10. For this purpose, the recess 19 is extended by a blind hole bore 26. The cross boring 25 and the blind hole bore 26 intersect, such that exiting testing gas infiltrates via the cross bore 25 and the blindfold bore 26 into the recess 19, from where detection can take place.

In the design example illustrated in FIGS. 6 through 9 a threading cap 11 has been provided which, as described before, ends up being pressed with its sealing surface 16 into the internally situated conical end section 15 in a leak-tight fashion against the sealing seat 18 formed in the sealing cone 17 of the pressure accumulator 2. A leakage channel 27 is formed by an exposed space 29 situated between the external circumference of the cylinder section 14 and an inner circumference section 28 of the pressure reservoir 2. The exposed space 29 is in contact with a cross bore 30 made into the wall of the pressure accumulator 2.

In cases of leakage in the area of the sealing seat 18, testing gas infiltrates via the exposed area 29 and the cross bore 30 to the outside, and can then be detected quickly and reliably.

Figure 10:
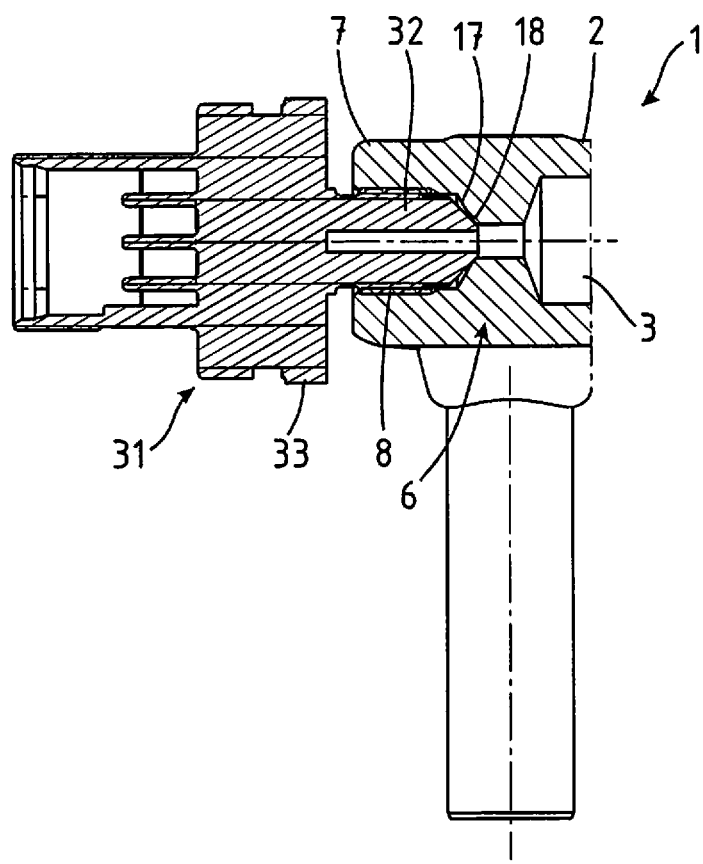
FIG. 10 shows the opening-side of a pressure accumulator with an integrated pressure sensor.
Figure 11:
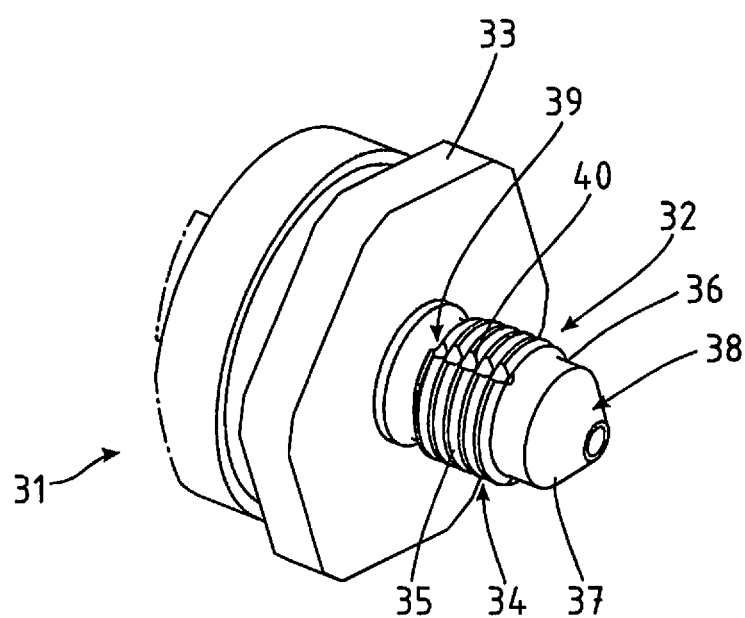
FIG. 11 shows a cutaway view of the pressure sensor as per the illustration in FIG. 9 in a perspective view toward the threading cap of the pressure sensor.

A fuel distributor 1 is also illustrated in FIGS. 10 and 11. The fuel distributor 1 features a pressure accumulator 2 with a longitudinal hollow space 3 for the purpose of receiving the pressurized fuel. The end 6 of the pressure accumulator 2 illustrated in FIG. 10 is configured as a threading socket 7 and features a threading section with internal threading 8. A sealing seat 18 is formed in a sealing cone 17 within the pressure accumulator 2. A pressure sensor or a sensor connection unit 31 is installed in the interior threading 8 of the threading socket 7. For this purpose the sensor connection unit 31 features a threading cap 32 which is integrated using a single uniform material and as a single component onto a flange 33 of the sensor connection unit 31. The threading cap 32 features a threading section 34 with exterior threading 35. A cylinder section 36 with a conical end section 37 on the threading section 34 connects to the free end. The conical end section 37 is configured as a sealing surface 38.

In order to mount and anchor in place the sensor connection unit 31, it is screwed into the interior threading 8 of the threading socket 7 with the threading cap 32. In this fashion, the conical end section 37 with its sealing surface 38 ends up being pressed into the sealing seat 18 of the sealing cone 17.

The threading cap 32 features a leakage channel 39. The leakage channel 39 is formed by the nuts 40 running axially in the longitudinal direction of the threading cap 32 on the exterior threading 35.

Preferably, three nuts 40 are arranged in a 120° partial circle on the exterior circumference of the threading cap 32 on the exterior threading 35. Gas escaping during a leak detection test will be able to run past the nuts 40 or the leakage channel 39 to the outside, and their presence detected there using a testing device.

REFERENCE NUMBERS

1—Fuel distributor
2—Pressure accumulator
3—Longitudinal hollow space
4—Injector connection
5—Mounting brackets
6—End of 2
7—Threading socket
8—Interior threading
9—Threading cap
10—Threading cap
11—Threading cap
12—Threading section
13—Exterior threading
14—Cylinder section
15—Conical end section
16—Sealing surface
17—Sealing cone
18—Sealing seat
19—Recess
20—Interior polyhedral surface
21—Leakage channel
22—Nut
23—Front side of 9
24—Leakage channel
25—Cross boring
26—Blind hole boring
27—Leakage channel
28—Interior circumference section
29—Exposed space
30—Cross boring
31—Sensor connection unit
32—Threading cap
33—Flange
34—Threading section
35—Exterior threading
36—Cylinder section
37—Conical end section
38—Sealing surface
39—Leakage channel
40—Nuts

The invention claimed is:

1. A fuel distributor, which features a pressure accumulator with a longitudinal hollow space to receive pressurized fuel, where the pressure accumulator possesses at least one threading socket featuring interior threading connected to the longitudinal hollow space, and where a threading cap is inserted into the threading socket, which itself features external threading, where the threading cap features a sealing surface, which ends up being pressed onto a sealing seat set up in the pressure accumulator, wherein the threading cap has a leakage channel formed by a cross bore in a cylindrical section which is connected to a recess.

2. The fuel distributor according to claim 1, wherein the threading cap has the cylindrical section with a conical end section, on which the sealing surface is formed.

3. The fuel distributor according to claim 1, wherein the threading cap has a recess with an interior polyhedral surface.

4. The fuel distributor according to claim 1, wherein the leakage channel is formed by an exposed space provided on the exterior circumference of the cylindrical section and an interior circumference section of the pressure reservoir.

5. The fuel distributor according to claim 1, wherein the threading socket is a single-piece component of the pressure accumulator and being made of a uniform single material.

6. The fuel distributor according to claim 1, wherein the threading cap is cold-flow pressed.

7. The fuel distributor according to claim 1, wherein the sealing seat is formed in a sealing cone of the pressure accumulator.

8. The fuel distributor according to claim 1, wherein the threading socket is formed on an opening-side end of the pressure accumulator.

9. The fuel distributor according to claim 1, wherein the threading socket is configured to receive a sensor.

* * * * *